United States Patent
Tanabe et al.

(10) Patent No.: US 11,929,787 B2
(45) Date of Patent: Mar. 12, 2024

(54) OPTICAL TRANSMISSION APPARATUS AND OPTICAL TRANSMISSION METHOD

(71) Applicant: NIPPON TELEGRAPH AND TELEPHONE CORPORATION, Tokyo (JP)

(72) Inventors: Akihiro Tanabe, Musashino (JP); Takashi Mitsui, Musashino (JP); Tomoaki Yoshida, Musashino (JP); Toshiaki Shitaba, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/911,027

(22) PCT Filed: Mar. 13, 2020

(86) PCT No.: PCT/JP2020/011149
§ 371 (c)(1),
(2) Date: Sep. 12, 2022

(87) PCT Pub. No.: WO2021/181665
PCT Pub. Date: Sep. 16, 2021

(65) Prior Publication Data
US 2023/0099159 A1 Mar. 30, 2023

(51) Int. Cl.
*H04B 10/03* (2013.01)
*H04B 10/294* (2013.01)
(Continued)

(52) U.S. Cl.
CPC ......... *H04B 10/614* (2013.01); *H04B 10/294* (2013.01); *H04B 10/572* (2013.01);
(Continued)

(58) Field of Classification Search
CPC .. H04B 10/614; H04B 10/294; H04B 10/572; H04B 10/032; H04B 10/03; H04B 10/07;
(Continued)

(56) References Cited

U.S. PATENT DOCUMENTS 6,433,900 B1 8/2002 Kuroyanagi et al.
7,181,137 B1 * 2/2007 Tamburello .......... H04B 10/032
398/28

(Continued)

FOREIGN PATENT DOCUMENTS

JP    H11239100 A    8/1999
JP    200351765 A    2/2003

OTHER PUBLICATIONS

International Telecommunication Union, ITU-T J.185: Transmission equipment for transferring multi-channel television signals over optical access networks by frequency modulation conversion, Recommendation ITU-T J.185, Edition 2.0, Jun. 13, 2012.

*Primary Examiner* — Dibson J Sanchez
(74) *Attorney, Agent, or Firm* — Harness, Dickey & Pierce, P.L.C.

(57) ABSTRACT

An optical transmission apparatus of an embodiment is an apparatus for redundantly transmitting a multiplexed signal obtained by multiplexing N (N is an integer of 2 or greater) optical signals having different wavelengths, the apparatus including: a first demultiplexing unit to which a first multiplexed signal is input, the first demultiplexing unit configured to demultiplex the input first multiplexed signal into the N optical signals; N first detection units to which the N optical signals demultiplexed by the first demultiplexing unit are respectively input, each of the N first detection units configured to detect presence or absence of deterioration of a corresponding input optical signals of the input optical signals based on a signal level of the corresponding input optical signal; a second demultiplexing unit to which a (Continued)

second multiplexed signal is input, the second demultiplexing unit configured to demultiplex the input second multiplexed signal into the N optical signals; N second detection units to which the N optical signals demultiplexed by the second demultiplexing unit are respectively input, each of the N second detection units configured to detect presence or absence of deterioration of a corresponding input optical signal of the input optical signals based on a signal level of the corresponding input optical signal; and a selection unit configured to select, based on the detection result of presence or absence of deterioration of each of the optical signals by the first detection units and the second detection units, N optical signals having different wavelengths from either the optical signals demultiplexed by the first demultiplexing unit or the optical signals demultiplexed by the second demultiplexing unit.

2 Claims, 8 Drawing Sheets

(51) Int. Cl.
| | | |
|---|---|---|
| *H04B 10/572* | (2013.01) | |
| *H04B 10/61* | (2013.01) | |
| H04B 10/032 | (2013.01) | |
| H04B 10/07 | (2013.01) | |
| H04J 14/02 | (2006.01) | |
| H04Q 11/00 | (2006.01) | |

(52) U.S. Cl.
CPC ............ *H04B 10/03* (2013.01); *H04B 10/032* (2013.01); *H04B 10/07* (2013.01); *H04J 14/02* (2013.01); *H04J 14/0287* (2013.01); *H04Q 2011/0081* (2013.01); *H04Q 2011/0083* (2013.01)

(58) Field of Classification Search
CPC ............... H04B 10/07955; H04J 14/02; H04J 14/0287; H04J 14/0293; H04Q 2011/0081; H04Q 2011/0083

USPC .......................................... 398/1–38, 43–103
See application file for complete search history.

(56) References Cited

U.S. PATENT DOCUMENTS

| | | | | |
|---|---|---|---|---|
| 7,561,799 | B2* | 7/2009 | Togawa | G02B 6/3562 398/19 |
| 8,676,054 | B2* | 3/2014 | Suzuki | H04B 10/671 398/213 |
| 9,008,501 | B2* | 4/2015 | Lutgen | H04B 10/032 398/4 |
| 10,476,587 | B2* | 11/2019 | Xie | H04B 10/038 |
| 2001/0021045 | A1* | 9/2001 | Tervonen | H04B 10/07955 398/5 |
| 2003/0016654 | A1* | 1/2003 | Das | H04J 14/029 370/351 |
| 2003/0123785 | A1* | 7/2003 | Sugitani | H04Q 11/0005 385/24 |
| 2005/0123296 | A1* | 6/2005 | Touma | H04J 14/02 398/45 |
| 2005/0207753 | A1* | 9/2005 | Touma | H04J 14/0294 398/32 |
| 2006/0104638 | A1* | 5/2006 | Chung | H04J 14/0226 398/71 |
| 2009/0169200 | A1* | 7/2009 | Li | H04J 14/0282 398/79 |
| 2009/0274459 | A1* | 11/2009 | Takita | H04Q 11/0005 398/48 |
| 2010/0119223 | A1* | 5/2010 | Ferrari | H04Q 11/0062 398/4 |
| 2010/0142940 | A1* | 6/2010 | Izumi | H04J 14/0267 398/2 |
| 2010/0142942 | A1* | 6/2010 | Rhee | H04Q 11/0066 398/45 |
| 2012/0248287 | A1* | 10/2012 | Shukunami | H04B 10/032 250/205 |
| 2020/0403707 | A1* | 12/2020 | Sugamoto | H04J 14/021 |

* cited by examiner

OPTICAL TRANSMISSION APPARATUS AND OPTICAL TRANSMISSION METHOD

CROSS-REFERENCE TO RELATED APPLICATIONS

This application is a 371 U.S. National Phase of International Application No. PCT/JP2020/011149, filed on Mar. 13, 2020. The entire disclosure of the above application is incorporated herein by reference.

TECHNICAL FIELD

The present invention relates to an optical transmission apparatus and an optical transmission method.

BACKGROUND ART

As a video communication network system that delivers video to a house of a subscriber, there is known a system that performs relay broadcasting by using an optical signal. FIG. 8 is a diagram illustrating a specific example of a configuration of a video communication network system using a technology in the related art. A video communication network system 900 illustrated in FIG. 8 is a system that redundantly transmits an identical video signal in two systems of optical transmission lines. For example, a frequency modulation (FM) collective conversion method is used for the video communication network system 900 (see NPL 1). The video communication network system 900 includes, for example, a transmitter 910, a transmitter 911, one or more transmission apparatuses 920, one or more transmission apparatuses 921, a WDM filter 930, and a receiver 950 and a receiver 951 installed in a house of each subscriber or the like. While one receiver 950 and one receiver 951 are illustrated in the same figure, the number of houses of subscribers, and the number of receivers 950 and the number of receivers 951 in a house of each subscriber are arbitrary. The WDM filter 930 and the receiver 950 are connected via an access network 940. The access network 940 performs wavelength multiplexing transmission.

The transmitter 910 inputs a video signal of terrestrial digital broadcasting, or a video signal of broadcasting by broadcasting satellites (BS) or broadcasting by communication satellites (CS) which is delivered to the ground from a satellite using a right-hand circular polarization. In the following, the video signal is also described as a terrestrial digital/BSCS right-hand video signal. The transmitter 911 inputs a video signal of the BS broadcasting or the CS broadcasting that is delivered to the ground from a satellite using a left-hand circular polarization. This is a video signal for new 4K/8K satellite broadcasting. In the following, the video signal is also described as a BSCS left-hand video signal. Each of the transmitter 910 and the transmitter 911 collectively converts input multi-channel video signals into wideband FM signals and then converts the wideband FM signals into optical signals to output the optical signals. An optical signal SG90 having a wavelength $\lambda 1$ (e.g., $\lambda 1$ is 1558 nm) output by the transmitter 910 is relayed and transmitted by the transmission apparatus 920, and is then input to the WDM filter 930. An optical signal SG91 having a wavelength $\lambda 2$ output by the transmitter 910 (e.g., $\lambda 2$ is 1552 nm) is relayed and transmitted by the transmission apparatus 920, and is then input to the WDM filter 930. Note that in the current state, the number of channels for the left-hand circular polarization is small, and thus $\lambda 2$=1558 nm is used.

The WDM filter 930 outputs a multiplexed signal SG92 obtained by multiplexing the optical signal SG90 for video relayed by the transmission apparatus 920, the optical signal SG91 for video relayed by the transmission apparatus 921, and an optical signal for communication input from a transmission apparatus (not illustrated) to the access network 940. A multiplexed signal SG93 transmitted in the access network 940 is demultiplexed, the receiver 950 receives a multiplexed signal SG93 for video having the wavelength $\lambda 1$, and the receiver 951 receives a multiplexed signal SG94 for video having the wavelength $\lambda 2$. Note that the receiver 950 and the receiver 951 cut signals having wavelengths other than a wavelength band supported by the receivers themselves with a filter.

However, in such a video communication network system in the related art, the terrestrial digital/BSCS right-hand video signal and the BSCS left-hand video signal are relayed in different systems. As a result, relay transmission equipment is required for each of systems for the terrestrial digital/BSCS right-hand video signal and the BSCS left-hand video signal. In addition, in this case, in a case where an abnormality has occurred in any of the systems, a video signal cannot be supplied to the receiver corresponding to the video signal transmitted in the system in which the abnormality has occurred. As such, it is examined to multiplex the terrestrial digital/BSCS right-hand video signal and the BSCS left-hand video signal using different wavelengths to redundantly transmit the multiplexed signal by a transmission apparatus of one system.

CITATION LIST

Non Patent Literature

NPL 1: "ITU-T J.185: Transmission equipment for transferring multi-channel television signals over optical access networks by frequency modulation conversion," International Telecommunication Union, June 2012.

SUMMARY OF THE INVENTION

Technical Problem

In a case where a multiplexed video signal (hereinafter referred to as a "multiplexed signal") is redundantly transmitted in a transmission apparatus of one system, a normal multiplexed signal is selected from among the multiplexed signals that have been redundantly transmitted, at a termination of the optical transmission line. Hereinafter, among the multiplexed signals to be redundantly transmitted, a system of multiplexed signals that are typically selected is referred to as an "operation system", and a system of multiplexed signals that are selected when an abnormality occurs in the operation system is referred to as a "preliminary system".

However, in this case, when an abnormality is detected in both the multiplexed signal of the operation system and the multiplexed signal of the preliminary system, even if the abnormality is an abnormality in some of optical signals that have been multiplexed, none of the multiplexed signals is selected, so that a video signal cannot be delivered to all receivers.

In view of the above circumstances, an object of the present invention is to provide an optical transmission apparatus and an optical transmission method that are capable of reducing a frequency of signal interruption in a system that transmits a multiplexed signal.

Means for Solving the Problem

An aspect of the present invention is an optical transmission apparatus for redundantly transmitting a multiplexed signal obtained by multiplexing N (N is an integer of 2 or greater) optical signals having different wavelengths, the optical transmission apparatus including: a first demultiplexing unit to which a first multiplexed signal is input, the first demultiplexing unit configured to demultiplex the input first multiplexed signal into the N optical signals; N first detection units to which the N optical signals demultiplexed by the first demultiplexing unit are respectively input, each of the first N detection units configured to detect presence or absence of deterioration of a corresponding input optical signal of the input optical signals based on a signal level of the corresponding input optical signal; a second demultiplexing unit to which a second multiplexed signal is input, the second demultiplexing unit configured to demultiplex the input second multiplexed signal into the N optical signals; N second detection units to which the N optical signals demultiplexed by the second demultiplexing unit are respectively input, each of the N second detection units configured to detect presence or absence of deterioration of a corresponding input optical signal of the input optical signals based on a signal level of the corresponding input optical signal; and a selection unit configured to select, based on the detection results of presence or absence of deterioration of each of the optical signals by the first detection units and the second detection units, N optical signals having different wavelengths from either the optical signals demultiplexed by the first demultiplexing unit or the optical signals demultiplexed by the second demultiplexing unit.

One aspect of the present invention is a method for redundantly transmitting a multiplexed signal obtained by multiplexing N (N is an integer of 2 or greater) optical signals having different wavelengths, the method including: a first demultiplexing step of inputting a first multiplexed signal and demultiplexing the input first multiplexed signal into the N optical signals; N first detection steps of inputting N optical signals demultiplexed in the first demultiplexing step, each of the N first detection steps including detecting presence or absence of deterioration a corresponding input optical signal of the input optical signals based on a signal level of the input optical signals; a second demultiplexing step of inputting a second multiplexed signal and demultiplexing the input second multiplexed signal into the N optical signals; N second detection steps of inputting N optical signals demultiplexed in the second demultiplexing step, each of the N second detection steps including detecting presence or absence of deterioration of a corresponding input optical signal of the input optical signals based on a signal level of the corresponding input optical signal; and a selection step of selecting, based on the detection result of presence or absence of deterioration of each of the optical signals in the first detection step and the second detection step, N optical signals having different wavelengths from either the optical signals demultiplexed in the first demultiplexing step or the optical signals demultiplexed in the second demultiplexing step.

Effects of the Invention

According to the present invention, it is possible to reduce a frequency of signal interruption in a system that transmits a multiplexed signal.

DESCRIPTION OF EMBODIMENTS

Hereinafter, embodiments of the present invention will be described in detail with reference to the drawings. A redundant optical transmission system according to an embodiment has a redundant configuration in which a transmission signal obtained by multiplexing optical signals having a plurality of wavelength bands is transmitted through a duplex transmission line. In the redundant optical transmission system, a signal level in each wavelength band or a level difference before multiplexing of the transmission signal is measured and retained in advance inside or outside the system. A signal selection apparatus of the redundant optical transmission system inputs two transmission signals transmitted through transmission lines that have been duplexed, and demultiplexes each of the transmission signals into optical signals by wavelength. The signal selection apparatus detects presence or absence of level reduction for each of the optical signals obtained by demultiplexing based on the retained information. When level reduction has been detected in one of the transmission signals, a switching unit of the signal selection apparatus selects and outputs the other of the transmission signals in which level reduction has not been detected. As a result, it is also possible to detect an abnormal condition more accurately even in signal transmission in a multiplexed state and perform switching of the transmission signal. Hereinafter, a case in which the redundant optical transmission system is a video communication network system that transmits a video signal will be described as an example.

First Embodiment

Figure 1:
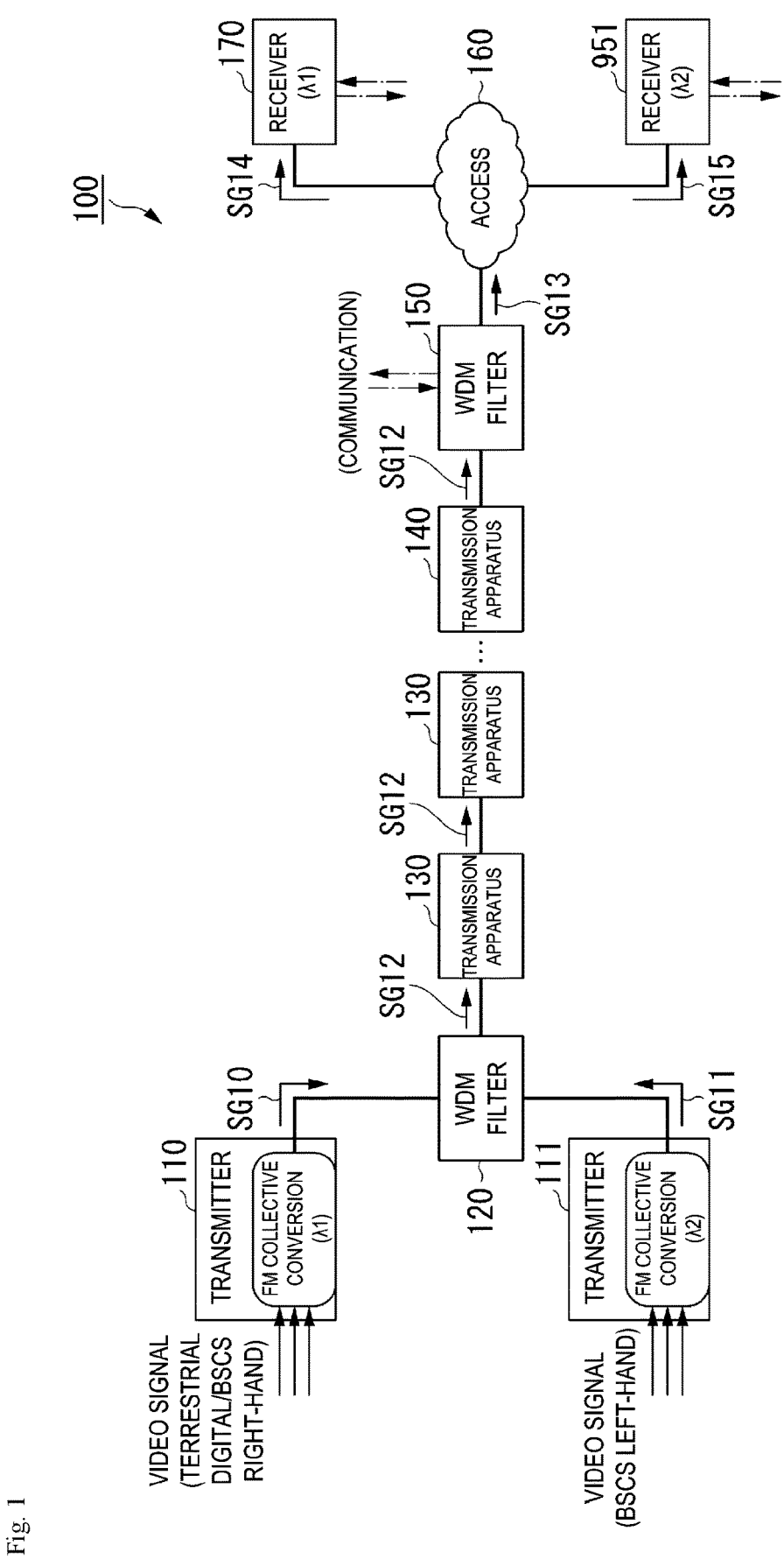
FIG. 1 is a diagram illustrating a configuration example of a video communication network system 100 according to a first embodiment.

FIG. 1 is a diagram illustrating a configuration example of a video communication network system 100 according to a first embodiment. The video communication network system 100 includes a transmitter 110, a transmitter 111, a WDM filter 120, one or more transmission apparatuses 130, a transmission apparatus 140, a WDM filter 150, and a receiver 170 and a receiver 171 installed in a house of each subscriber or the like. While one receiver 170 and one receiver 171 are illustrated in the same figure, the number of houses of subscribers, and the number of receivers 170 and the number of the receivers 171 in a house of each subscriber are arbitrary. The WDM filter 150, and the receiver 170 and receiver 171 are connected via an access network 160. The access network 160 performs wavelength multiplexing transmission. The transmitter 110, the transmitter 111, the access network 160, the receiver 170, and the receiver 171 are the same as the transmitter 910, the transmitter 911, the access network 940, the receiver 950, and the receiver 950 illustrated in FIG. 8.

Figure 8:
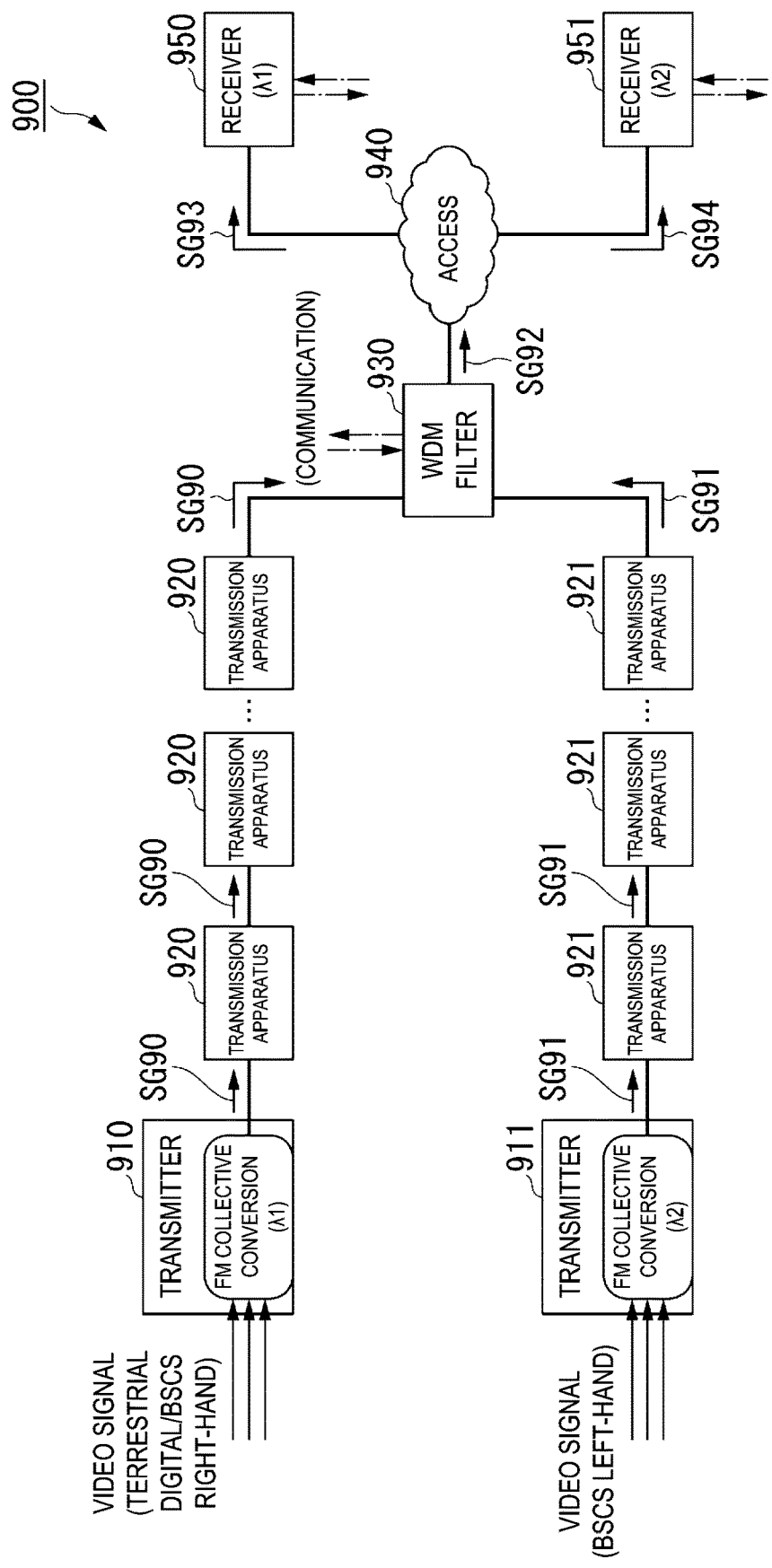
FIG. 8 is a diagram illustrating a specific example of a configuration of a video communication network system using the technology in the related art.

Similarly to the transmitter 910 illustrated in FIG. 8, the transmitter 110 inputs a video signal of the terrestrial digital broadcasting or a video signal of the BS broadcasting or the CS broadcasting delivered to the ground from a satellite using the right-hand circular polarization, and collectively converts the video signal into a wideband FM signal. The transmitter 110 converts the collectively converted FM signal into an optical signal SG10 having a wavelength $\lambda 1$ and inputs the optical signal SG10 to the WDM filter 120. Similarly to the transmitter 910 illustrated in FIG. 8, the transmitter 111 inputs a video signal of the BS broadcasting or the CS broadcasting delivered to the ground from a satellite using the left-hand circular polarization, and collectively converts the video signal into a wideband FM signal. The transmitter 111 converts the collectively converted FM signal into an optical signal SG11 having a wavelength $\lambda 2$ and inputs the optical signal SG11 to the WDM filter 120.

The WDM filter 120 outputs a multiplexed signal SG12 obtained by multiplexing the optical signal SG10 having the wavelength $\lambda 1$ input from the transmitter 110 and the optical signal SG11 having the wavelength $\lambda 2$ input from the transmitter 111. The multiplexed signal SG12 output by the WDM filter 120 is relayed and transmitted by the one or more transmission apparatuses 130 and the transmission apparatus 140, and is then input to the WDM filter 150.

The WDM filter 150 outputs a multiplexed signal SG13 obtained by multiplexing the multiplexed signal SG12 input from the transmission apparatus 140 and an optical signal for communication input from a transmission apparatus (not illustrated), to the access network 160. The multiplexed signal SG13 transmitted in the access network 160 is demultiplexed, the receiver 170 receives an optical signal SG14 for video having the wavelength $\lambda 1$, and the receiver 171 receives an optical signal SG15 for video having the wavelength $\lambda 2$.

Figure 2:
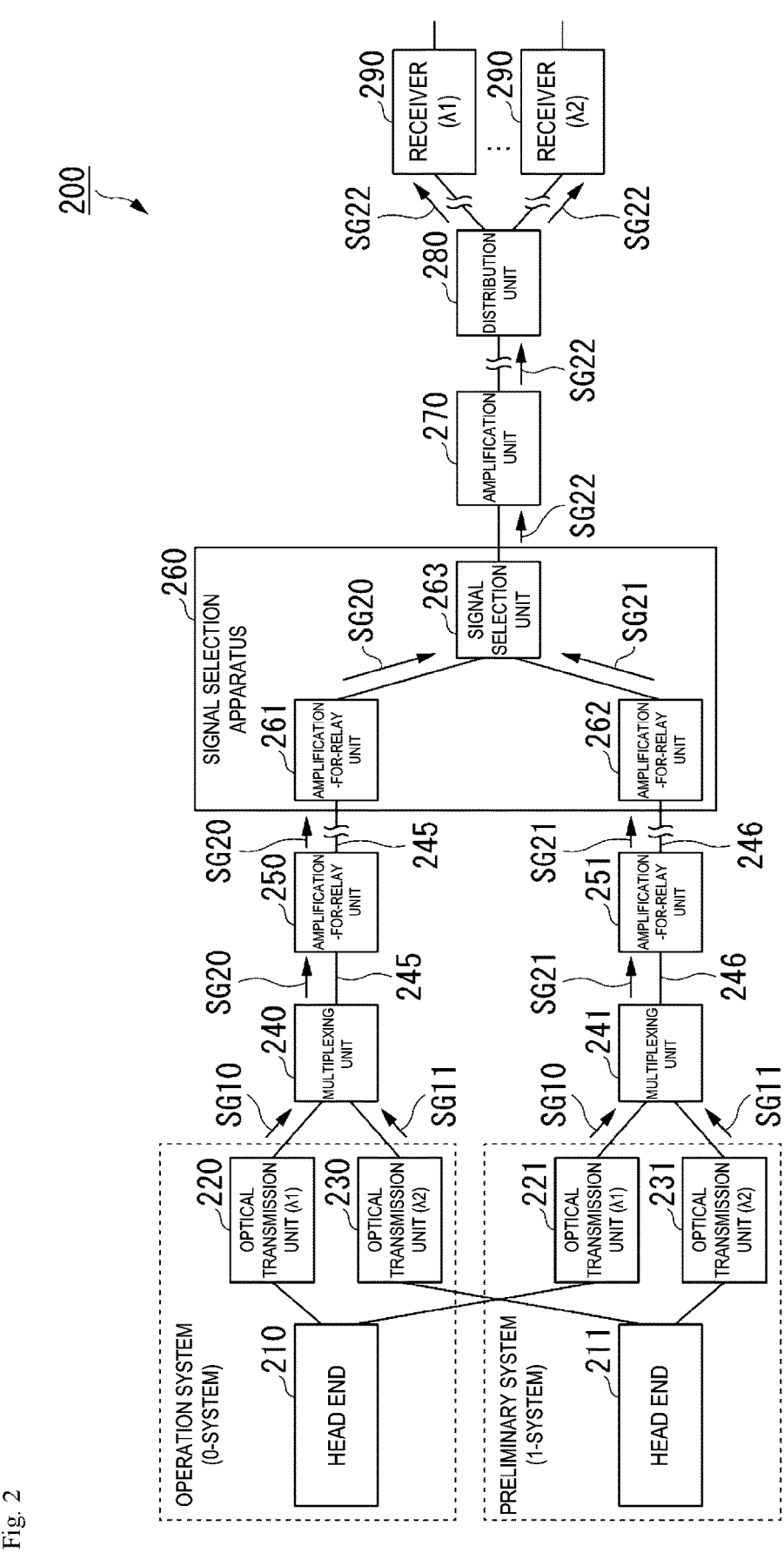
FIG. 2 is a diagram illustrating a configuration of an optical transmission system 200 according to the first embodiment.

In the video communication network system 100, dual wavelength transmission from the WDM filter 120 to the WDM filter 150 is duplexed. With reference to FIG. 2, a configuration of the dual wavelength transmission applied to the video communication network system 100 will be described.

FIG. 2 is a diagram illustrating a configuration of an optical transmission system 200 according to the first embodiment. The optical transmission system 200 includes a head end 210, a head end 211, an optical transmission unit 220, an optical transmission unit 221, an optical transmission unit 230, an optical transmission unit 231, a multiplexing unit 240, a multiplexing unit 241, one or more amplification units for relay 250, one or more amplification units for relay 251, a signal selection apparatus 260, one or more amplification units 270, one or more distribution units 280, and one or more optical reception units 290. A 0-system is an operation system, and a 1-system is a preliminary system. The head end 210, the optical transmission unit 220, and the optical transmission unit 230 are operation systems. The head end 211, the optical transmission unit 221, and the optical transmission unit 231 are preliminary systems.

The head end 210, the optical transmission unit 220, and the optical transmission unit 230 correspond to the transmitter 110 illustrated in FIG. 1, and the head end 211, the optical transmission unit 221, and the optical transmission unit 231 correspond to the transmitter 111 illustrated in FIG. 1. The multiplexing unit 240 and the multiplexing unit 241 correspond to the WDM filter 120 illustrated in FIG. 1. The amplification-for-relay unit 250 may be the transmission apparatus 130 illustrated in FIG. 1, or may be an amplifier connected to the transmission apparatus 130. The signal selection apparatus 260 corresponds to the transmission apparatus 140 illustrated in FIG. 1. The amplification unit 270 is connected to a preceding stage of the WDM filter 150 illustrated in FIG. 1, and the distribution unit 280 is connected to a subsequent stage of the WDM filter 150 illustrated in FIG. 1. The optical reception units 290 correspond to the receiver 170 and the receiver 171 illustrated in FIG. 1.

The head end 210 receives, by radio waves, a video signal of the terrestrial digital broadcasting transmitted from a broadcast station, or a video signal of the BS broadcasting or the CS broadcasting delivered to the ground from a satellite using the right-hand polarization. Wavelengths of video signals are different for each channel. The head end 210 converts a video signal of each channel into an electrical signal and transmits the electrical signal to the optical transmission unit 220 and the optical transmission unit 221. The optical transmission unit 220 and the optical transmission unit 221 each convert the received electrical signal of each channel into the optical signal SG10 having the wavelength $\lambda 1$. FM collective conversion is used for the conversion. The optical transmission unit 220 outputs the optical signal SG10 after conversion to the multiplexing unit 240, and the optical transmission unit 221 outputs the optical signal SG10 after conversion to the multiplexing unit 241.

The head end 211 receives, by radio waves, a video signal of the new 4K/8K satellite broadcasting transmitted from the broadcast station. Wavelengths of video signals are different for each channel. head end 211 converts a video signal of each channel into an electrical signal and transmits the electrical signal to the optical transmission unit 230 and the optical transmission unit 231. The optical transmission unit 230 and the optical transmission unit 231 each convert the received electrical signal of each channel into the optical signal SG11 having the wavelength $\lambda 2$. FM collective conversion is used for the conversion. The optical transmission unit 230 outputs the optical signal SG11 after conversion to the multiplexing unit 240, and the optical transmission unit 231 outputs the optical signal SG11 after conversion to the multiplexing unit 241.

The multiplexing unit 240 multiplexes the optical signal SG10 having the wavelength $\lambda 1$ received from the optical transmission unit 220 and the optical signal SG11 having the wavelength $\lambda 2$ received from the optical transmission unit 230, and outputs a 0-system multiplexed signal SG20 to the transmission line 245. The multiplexed signal SG20 of the optical signals is amplified in the one or more amplification units for relay 250 provided in the transmission line 245, and relayed to a subsequent stage.

The multiplexing unit 241 multiplexes the optical signal SG10 having the wavelength λ1 received from the optical transmission unit 221 and the optical signal SG11 having the wavelength λ2 received from the optical transmission unit 231, and outputs a 1-system multiplexed signal SG21 to the transmission line 246. The multiplexed signal SG21 of the optical signals is amplified in the one or more amplification units for relay 251 provided in the transmission line 246, and relayed to a subsequent stage.

The signal selection apparatus 260 includes an amplification-for-relay unit 261, an amplification-for-relay unit 262, and a signal selection unit 263. The amplification-for-relay unit 261 amplifies the 0-system multiplexed signal SG20 transmitted through the transmission line 245 and outputs the amplified 0-system multiplexed signal SG20 to the signal selection unit 263. The amplification-for-relay unit 262 amplifies the 1-system multiplexed signal SG21 transmitted through the transmission line 246 and outputs the amplified 1-system multiplexed signal SG21 to the signal selection unit 263. The signal selection unit 263 selects either the multiplexed signal SG20 or the multiplexed signal SG21, and outputs the selected signal as a multiplexed signal SG22 to a subsequent stage.

The amplification unit 270 amplifies the multiplexed signal SG22 output by the signal selection apparatus 260 and outputs the amplified multiplexed signal SG22 to the access network. The distribution unit 280 distributes the multiplexed signal SG22 received via the access network. The optical reception unit 290 receives the multiplexed signal SG22 distributed by the distribution unit 280 and receives the optical signal SG10 having the wavelength λ1 or the optical signal SG11 having the wavelength λ2 multiplexed into the multiplexed signal SG22.

Figure 3:
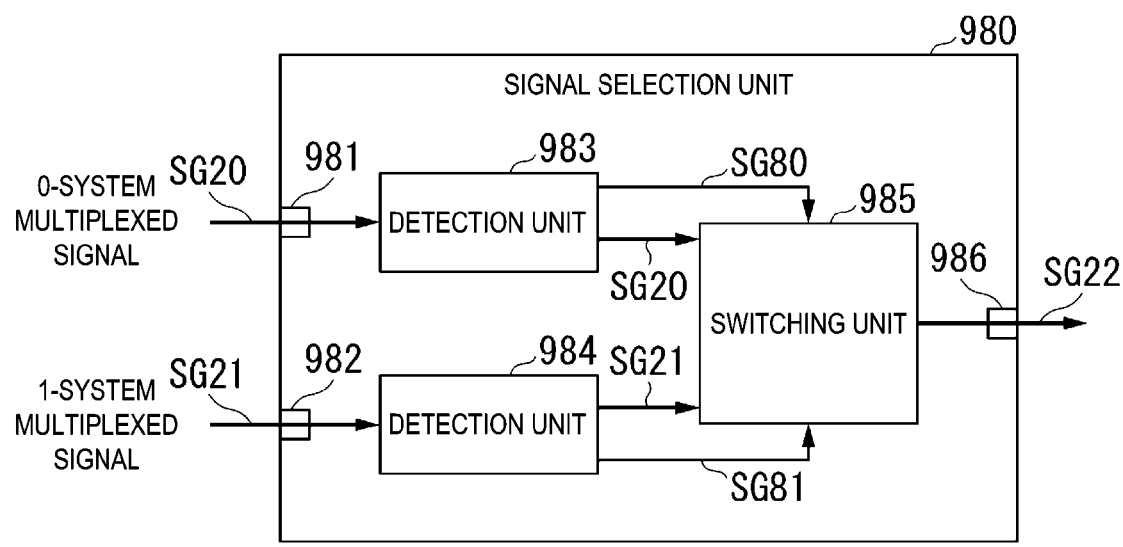
FIG. 3 is a diagram illustrating a configuration example of a signal selection unit 980 according to a technology in the related art.

Here, a configuration of a signal selection unit according to a technology in the related art will be described. FIG. 3 is a diagram illustrating a configuration example of a signal selection unit 980 according to the technology in the related art. The signal selection unit 980 includes an optical input unit 981, an optical input unit 982, a detection unit 983, a detection unit 984, a switching unit 985, and an optical output unit 986. The optical input unit 981 inputs the 0-system multiplexed signal SG20, and the optical input unit 982 inputs the 1-system multiplexed signal SG21. The detection unit 983 is configured to perform processing of outputting the 0-system multiplexed signal SG20 input by the optical input unit 981 to the switching unit 985, and processing of, when a level reduction of the 0-system multiplexed signal SG20 is detected, outputting a switching request signal SG80 for switching to the 1-system to the switching unit 985. The detection unit 983 is configured to perform processing of outputting the 1-system multiplexed signal SG21 input by the optical input unit 982 to the switching unit 985 and processing of, when a level reduction of the 1-system multiplexed signal SG21 is detected, outputting a switching request signal SG81 for switching to the 0-system to the switching unit 985. The switching request signal SG80 and the switching request signal SG81 each are a control signal.

When receiving the switching request signal SG80 for switching to the 1-system, the switching unit 985 outputs the 1-system multiplexed signal SG21 to the optical output unit 986. When receiving the switching request signal SG81 for switching to the 0-system, the switching unit 985 outputs the 0-system multiplexed signal SG20 to the optical output unit 986. The optical output unit 986 outputs the 0-system multiplexed signal SG20 or the 1-system multiplexed signal SG21 output by the switching unit 985 as the multiplexed signal SG22 to a subsequent stage. Note that the signal selection unit 980 may implement a level adjustment function, but the level adjustment function is omitted in FIG. 8.

The multiplexed signal SG20 and the multiplexed signal SG21 each are a signal obtained by multiplexing the optical signal SG10 having the wavelength λ1 and the optical signal SG11 having the wavelength λ2. The detection unit 983 detects a level reduction in the multiplexed signal SG20, and the detection unit 984 detects a level reduction in the multiplexed signal SG21. However, neither the detection unit 983 nor the detection unit 984 can detect which of the optical signal SG10 having the wavelength λ1 and the optical signal SG11 having the wavelength λ2 is abnormal, for the received multiplexed signal. Due to this, when at least one of the optical signal SG10 and the optical signal SG11 synthesized in the multiplexed signal is abnormal, the signal selection unit 980 does not select the multiplexed signal. As a result, according to the signal selection unit 980 of the technology in the related art, in both the 0-system multiplexed signal and the 1-system multiplexed signal, when an abnormality has occurred in some of the optical signals, both the multiplexed signals are not selected, and both the systems are determined to be abnormal.

Figure 4:
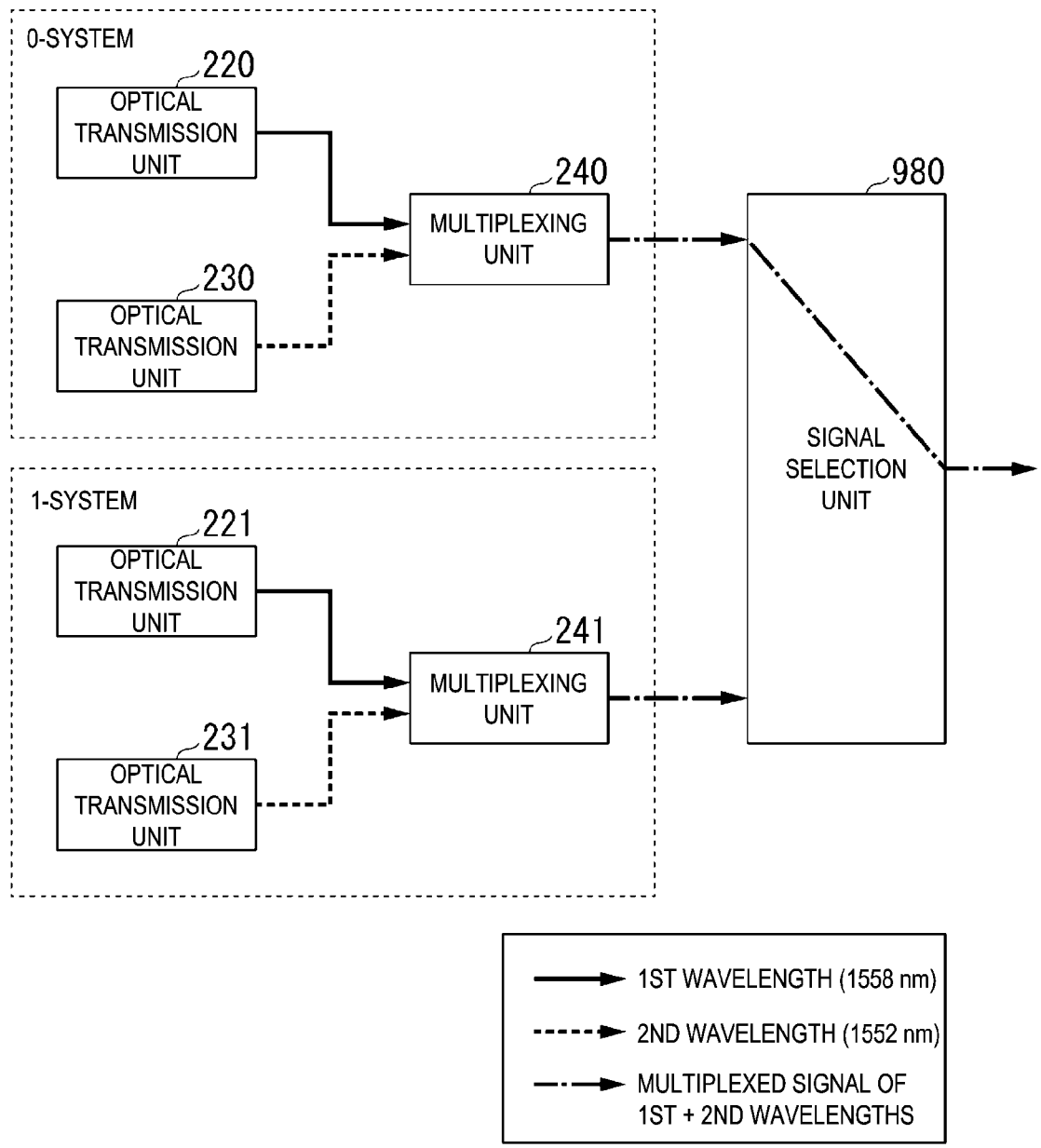
FIG. 4 is a first drawing for explaining a specific example in which it is determined that both systems are abnormal according to a signal selection unit of the technology in the related art.
Figure 5:
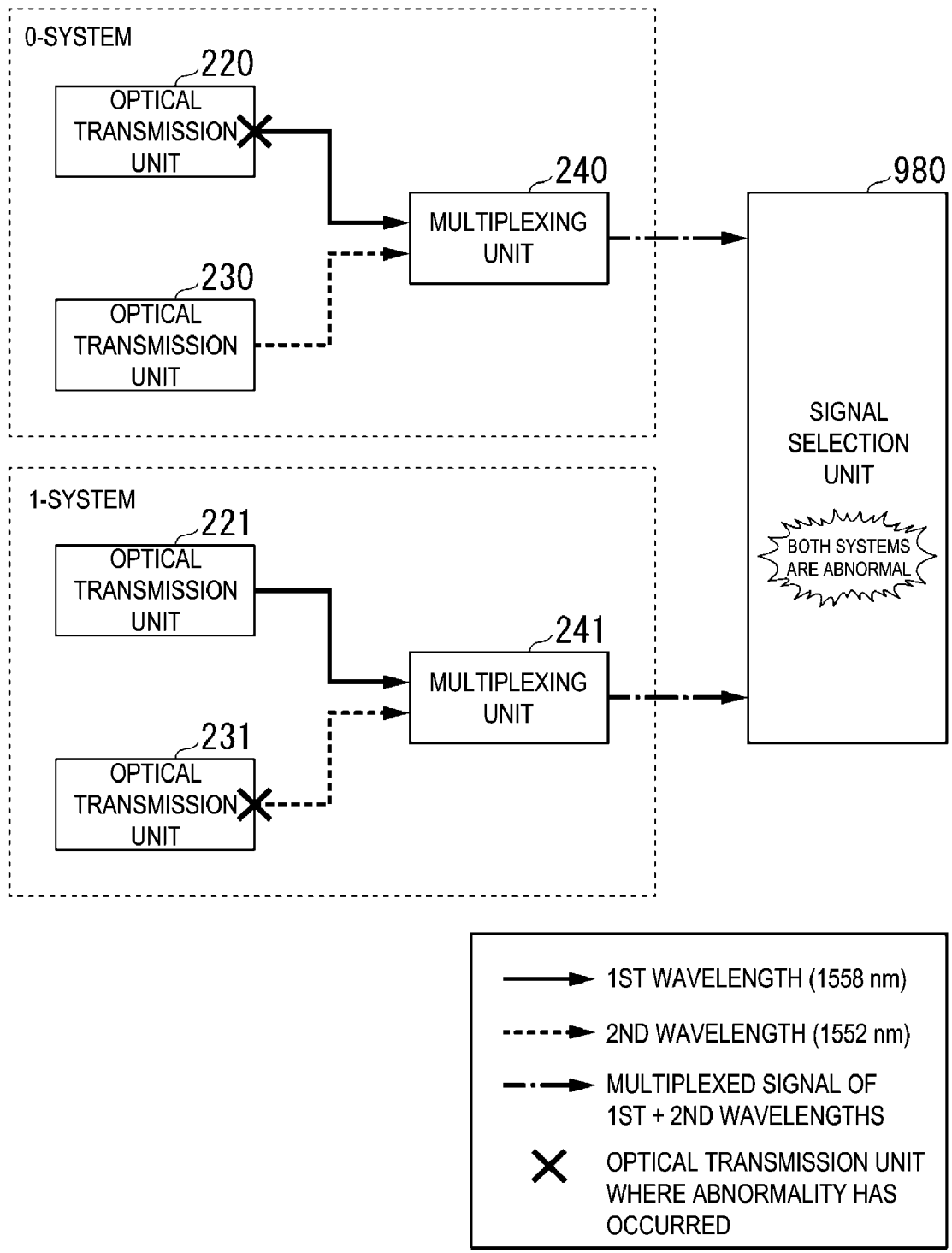
FIG. 5 is a second diagram for explaining the specific example in which it is determined that both the systems are abnormal according to the signal selection unit of the technology in the related art.

FIGS. 4 and 5 are diagrams for explaining a specific example in which it is determined that both the systems are abnormal according to the signal selection unit of the technology in the related art. FIG. 4 illustrates a specific example at a normal time, and FIG. 5 illustrates a specific example at a time when it is determined that both the systems are abnormal. Note that, for simplicity, in FIGS. 4 and 5, the amplification-for-relay unit between the multiplexing unit and the signal selection unit is omitted, but it is assumed that an optical signal is appropriately amplified between the multiplexing unit and the signal selection unit as needed.

As illustrated in FIG. 4, at the normal time when both the 0-system multiplexed signal and the 1-system multiplexed signal are normal, the signal selection unit 263 selects the 0-system multiplexed signal and outputs the 0-system multiplexed signal to a subsequent stage. On the other hand, as illustrated in FIG. 5, when an abnormality has occurred in some optical signals in both the 0-system multiplexed signal and the 1-system multiplexed signal, the signal selection unit 263 determines that both the systems are abnormal and selects none of the multiplexed signals. In this case, the video signal cannot be delivered to both the receiver that receives an optical signal having a first wavelength of 1558 nm and the receiver that receives an optical signal having a second wavelength of 1552, the optical signal having the first wavelength and the optical signal having second wavelength constituting the multiplexed signal.

However, in the case of the example in FIG. 5, the optical signal having the second wavelength is normally transmitted in the 0-system, and the optical signal having the first wavelength is normally transmitted in the 1-system. so that for the whole of the 0-system and the 1-system, the signals required for distribution are normally obtained. Thus, if the optical signals that are normally transmitted in the 0-system and the 1-system are used, it is possible to continue distribution of required video signals. The signal selection apparatus 260 of the first embodiment includes the signal selection unit 263 as a signal selection unit that enables transmission of the multiplexed signal in such a case.

Figure 6:
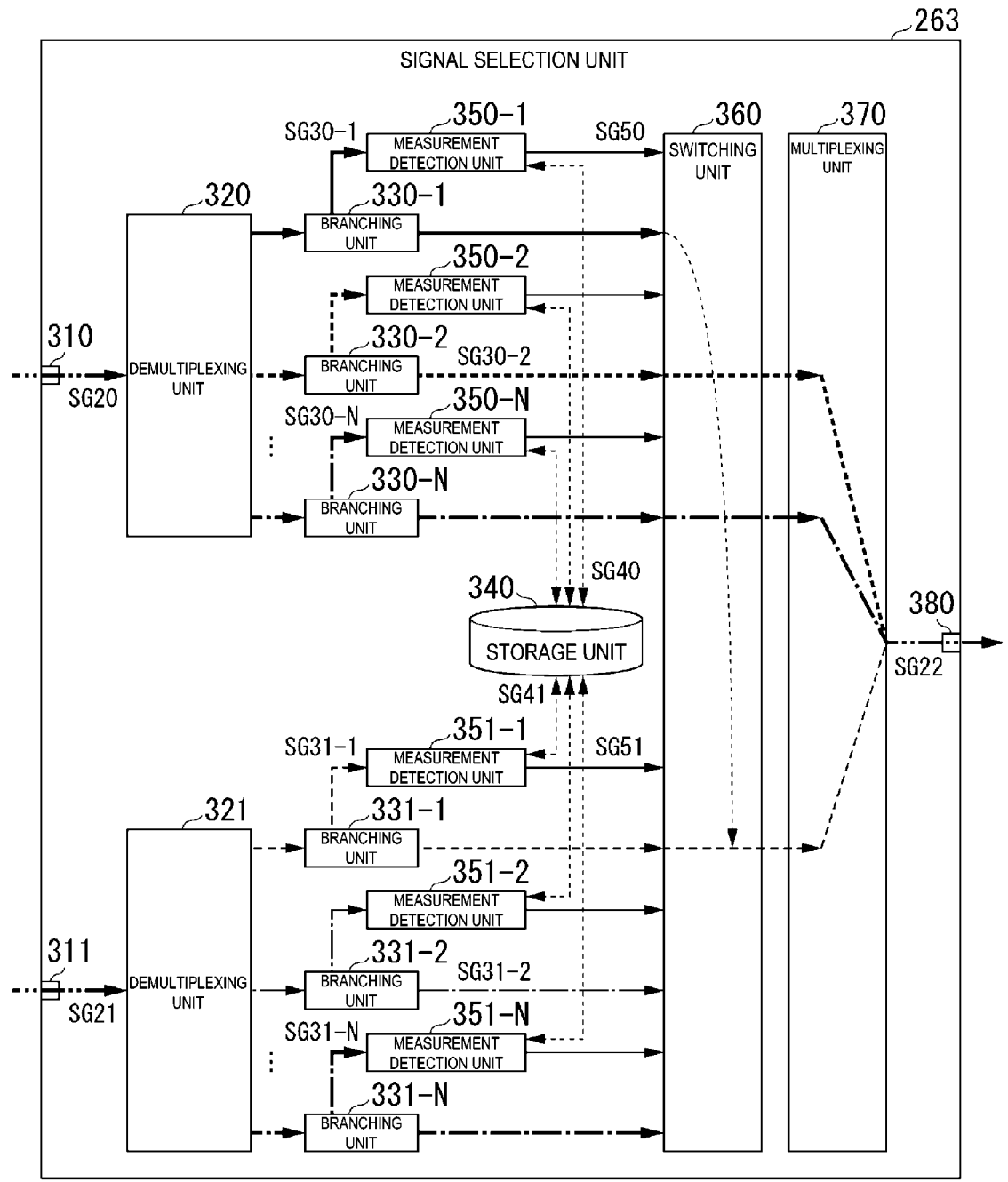
FIG. 6 is a diagram illustrating a detailed configuration example of a signal selection unit 263 according to the first embodiment.

FIG. 6 is a diagram illustrating a detailed configuration example of the signal selection unit 263 according to the first embodiment. The signal selection unit 263 includes an optical input unit 310, an optical input unit 311, a demultiplexing unit 320, a demultiplexing unit 321, a branching unit 330, a branching unit 331, a storage unit 340, measurement detection units 350-1 to 350-N (N is an integer of 2 or greater), measurement detection units 351-1 to 351-N, a switching unit 360, a multiplexing unit 370, and an optical output unit 380.

The optical input unit 310 inputs a 0-system multiplexed signal SG20 and outputs the signal to the demultiplexing unit 320. The optical input unit 311 inputs a 1-system multiplexed signal SG21 and outputs the signal to the demultiplexing unit 321. Here, the multiplexed signals SG20 and SG21 are each a signal obtained by multiplexing optical signals having N wavelengths.

The demultiplexing unit 320 demultiplexes the 0-system multiplexed signal SG20 input from the optical input unit 310 into optical signals SG30-1 to SG30-N having N wavelengths. The demultiplexing unit 320 outputs the optical signal SG30-$n$ ($n$ is an integer of 1 or greater and N or less) to the branching unit 330-$n$. The demultiplexing unit 321 demultiplexes the 1-system multiplexed signal SG21 input from the optical input unit 311 into optical signals SG31-1 to SG31-N having N wavelengths. The demultiplexing unit 321 outputs the optical signal SG31-$n$ ($n$ is an integer of 1 or greater and N or less) to the branching unit 331-$n$.

The branching unit 330-$n$ branches the optical signal SG30-$n$ input from the demultiplexing unit 320, outputs one of the branched portions of the optical signal SG30-$n$ to the measurement detection unit 350-$n$, and outputs the remaining one of the branched portions of the optical signal SG30-$n$ to the switching unit 360. The branching unit 331-$n$ branches the optical signal SG31-$n$ input from the demultiplexing unit 320, outputs one of the branched portions of the optical signal SG31-$n$ to the measurement detection unit 351-$n$, and outputs the remaining one of the branched portions of the optical signal SG31-$n$ to the switching unit 360.

The storage unit 340 stores a setting table in advance. The setting table indicates thresholds of optical signal levels of wavelengths required for detection for performing switching. The thresholds of the optical signal levels for the N wavelengths are described as optical signal level thresholds P1 to P(N). The measurement detection units 350-1 to 350-N and 351-1 to 351-N use a control signal SG40 to read information from the storage unit 340.

The measurement detection unit 350-$n$ measures a level M0(n) of the input optical signal SG30-$n$. The measurement detection unit 350-$n$ reads an optical signal level threshold P(n) stored in the storage unit 340 and compares it to the level M0(n). When M0(n)≤P(n) or M0(n)<P(n) is satisfied, the measurement detection unit 350-$n$ outputs a switching instruction SG50-$n$ indicating that a selection destination of an optical signal having the nth wavelength is switched from the 0-system to the 1-system, to the switching unit 360.

The measurement detection unit 351-$n$ measures a level M1(n) of the input optical signal SG31-$n$. The measurement detection unit 351-$n$ reads the optical signal level threshold P(n) stored in the storage unit 340 and compares it to the optical signal level M1(n). When M1(n)≤P(n) or M1(n)<P(n) is satisfied, the measurement detection unit 351-$n$ outputs a switching instruction SG51-$n$ indicating that the selection destination of the optical signal having the nth wavelength is switched from the 1-system to the 0-system, to the switching unit 360.

When receiving the switching instruction SG50-$n$ from any of the measurement detection units 350-1 to 350-N, the switching unit 360 switches the selection destination of the optical signal having the nth wavelength from the 0-system to the 1-system. Further, when receiving the switching instruction SG51-$n$ from any of the measurement detection units 351-1 to 351-N, the switching unit 360 switches the selection destination of the optical signal having the nth wavelength from the 1-system to the 0-system. The switching unit 360 selects the optical signals having the first to Nth wavelengths from either the 0-system or the 1-system based on the switching instruction, and outputs the selected optical signals of the N wavelengths to the multiplexing unit 370. Note that it is assumed that when receiving a plurality of switching instructions, the switching unit 360 switches the selection destination of the optical signals for each of the received switching instructions.

The multiplexing unit 370 multiplexes the optical signals of the N wavelengths output from the switching unit 360 to generate the multiplexed signal SG22, and outputs the generated multiplexed signal SG22 to the optical output unit 380.

The optical output unit 380 outputs the multiplexed signal SG22 output from the multiplexing unit 370 to a subsequent stage.

For example, FIG. 6 illustrates an example in which the switching unit 360 has switched the selection destination of the optical signal having the first wavelength from the 0-system to the 1-system. In this case, the switching unit 360 selects the SG31-1 as the optical signal having the first wavelength, and selects the SG30-2 to SG30-N as the optical signals having the second to Nth wavelengths. The switching unit 360 outputs the selected optical signals SG31-1 and SG30-2 to SG30-N to the multiplexing unit 370. The multiplexing unit 370 multiplexes the 1-system optical signal SG31-1 output from the switching unit 360 and the 0-system optical signals SG30-2 to SG30-N to generate the multiplexed signal SG22, and outputs the generated multiplexed signal SG22 to the optical output unit 380.

According to the signal selection apparatus of the first embodiment configured in this manner, even in a case where an abnormality has occurred in the multiplexed signal in both the 0-system and the 1-system, when required optical signals are normally obtained in both the system, it is possible to continue transmission of the multiplexed signal. Thus, in a system that transmits the multiplexed signal, it is possible to reduce the frequency of signal interruption.

Modified Example

The storage unit 340 may be provided in an apparatus outside the signal selection apparatus 260, or may be provided outside the signal selection unit 263 in the signal selection apparatus 260. Furthermore, some of the functions of the measurement detection units 350-1 to 350-N and 351-1 to 351-N, and the storage unit 340 may be included in an apparatus outside the signal selection unit 263 or the signal selection apparatus 260. For example, an external control apparatus that monitors and controls the video communication network system 100 or the optical transmission system 200 may have some of the functions of the measurement detection units 350-1 to 350-N and 351-1 to 351-N. In this case, the measurement detection unit 350-$n$ may measure the level M0(n) of the optical signal SG30-$n$ to notify the control apparatus of the measured level, and the measurement detection unit 351-$n$ may measure the level M1(n) of the optical signal SG31-$n$ and notifies the control apparatus of the measured level. When M0(n)≤P(n) or M0(n)<P(n) is satisfied, the control apparatus outputs the switching instruction SG50 for switching to the 1-system to the switching unit 360, and when M1(n)≤P(n) or M1(n)<P (n) is satisfied, the control apparatus outputs the switching instruction SG51 for switching to the 1-system to the switching unit 360.

Note that in order to compensate for level reduction due to branching or demultiplexing, a level adjustment unit (AMP) that amplifies a multiplexed signal may be provided between the demultiplexing unit 320 and the branching unit 330, between the branching unit 330 and the switching unit 360, between the demultiplexing unit 321 and the branching unit 331, or between the branching unit 331 and the switching unit 360.

The measurement detection unit 350-$n$ may be configured to instruct the switching unit 360 to switch the selection destination of the optical signal having the nth wavelength back to the 0-system from the 1-system, when an optical signal level of the 0-system optical signal having the nth wavelength returns to the threshold or higher after an instruction for switching the selection destination of the optical signal having the nth wavelength from the 0-system to the 1-system has been issued. Similarly, the measurement detection unit 351-$n$ may be configured to instruct the switching unit 360 to switch the selection destination of the optical signal having the nth wavelength back to the 1-system from the 0-system, when an optical signal level of the 1-system optical signal having the nth wavelength returns to the threshold or higher after an instruction for switching the selection destination of the optical signal having the nth wavelength from the 1-system to the 0-system has been issued. Note that, when the 0-system optical signal is preferentially selected, this function may be provided only in the measurement detection unit 350 for the 0-system.

Second Embodiment

The signal selection apparatus according to the first embodiment demultiplexes the 0-system and 1-system multiplexed signals, and compares an optical signal level of each wavelength obtained by demultiplexing to a threshold to detect deterioration of an optical signal. In contrast, a signal selection apparatus according to a second embodiment detects deterioration of an optical signal based on an optical signal level difference between adjacent wavelengths.

If the optical signal level difference between adjacent wavelengths deviates from a range of specified values, a quality of a weaker optical signal may decrease. Thus, in the present embodiment, a threshold $B_{ij}$ (i and j are each an integer of 1 or greater and N or less) is provided for an optical signal level difference between the ith wavelength and the jth wavelength adjacent to each other. The signal selection apparatus performs switching between a 0-system multiplexed signal and a 1-system multiplexed signal to be output based on comparison between a measurement value $D_{ij}$ (i and j are each an integer of 1 or greater and N or less) of an optical signal level difference between the adjacent two wavelengths and the threshold $B_{ij}$. Hereinafter, in the present embodiment, differences from the first embodiment will be mainly described.

Figure 7:
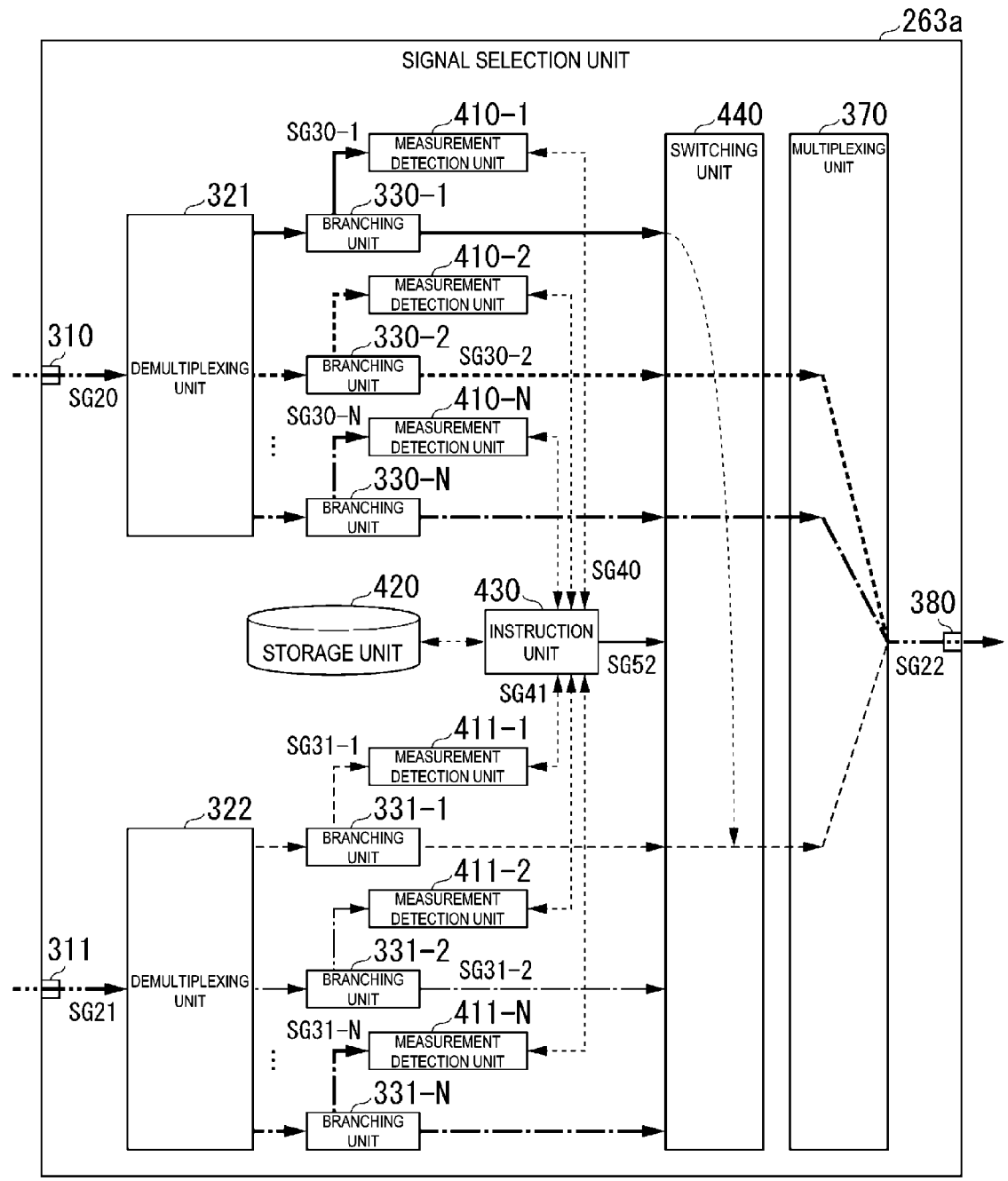
FIG. 7 is a diagram illustrating a detailed configuration of a signal selection unit 263a of a second embodiment.

FIG. 7 is a diagram illustrating a detailed configuration of a signal selection unit 263$a$ of the second embodiment. In FIG. 7, the same portions as those of the signal selection unit 263 according to the first embodiment illustrated in FIG. 6 are denoted by the same reference numerals and signs, and description thereof will be omitted. The signal selection unit 263$a$ includes an optical input unit 310, an optical input unit 311, a demultiplexing unit 320, a demultiplexing unit 321, a branching unit 330, a branching unit 331, measurement detection units 410-1 to 410-N (N is an integer of two or greater), measurement detection units 411-1 to 411-N, a storage unit 420, an instruction unit 430, a switching unit 440, a multiplexing unit 370, and an optical output unit 380.

The demultiplexing unit 320 outputs an optical signal SG30-$n$ (n is an integer of 1 or greater and N or less) obtained by demultiplexing a 0-system multiplexed signal SG20 input from the optical input unit 310 to the branching unit 330-$n$. The demultiplexing unit 321 outputs an optical signal SG31-$n$ (n is an integer of 1 or greater and N or less) obtained by demultiplexing a 1-system multiplexed signal SG21 input from the optical input unit 311 to the branching unit 331-$n$.

The branching unit 330-$n$ branches the optical signal SG30-$n$ input from the demultiplexing unit 320 to the measurement detection unit 410-$n$ and the switching unit 360. The branching unit 331-$n$ outputs the optical signal SG31-$n$ input from the demultiplexing unit 320 to the measurement detection unit 411-$n$ and the switching unit 360.

The measurement detection unit 410-$n$ measures the level M0(n) of the optical signal SG30-$n$ input from the branching unit 330-$n$, and outputs the measured level M0(n) to the instruction unit 430. The measurement detection unit 411-$n$ measures the level M1(n) of the optical signal SG31-$n$ input from the branching unit 331-$n$, and outputs the measured level M1(n) to the instruction unit 430.

The storage unit 420 stores a setting table. The setting table indicates a threshold $B_{ij}$ (i and j are each an integer of 1 or greater and N or less) of an optical signal level difference between two wavelengths of the ith wavelength and the jth wavelength adjacent to each other. The instruction unit 430 receives optical signal levels M0(1) to M0(N) of the respective wavelengths from the measurement detection units 410-1 to 410-N, and receives optical signal levels M1(1) to M1(N) of the respective wavelengths from the measurement detection units 411-1 to 411-N. The instruction unit 430 uses the optical signal levels M0(1) to M0(N) to calculate a level difference $D0_{ij}$ (=M0(i)−M0(j)) between optical signal levels of a wavelength i and a wavelength j adjacent to each other for the 0-system. The instruction unit 430 reads the threshold $B_{ij}$ from the setting table stored in the storage unit 420 and compares the threshold to the level difference $D0_{ij}$.

When any of the level differences $D0_{ij}$ is the threshold $B_{ij}$ or greater ($D0_{ij} \geq B_{ij}$), or the threshold $B_{ij}$ or less ($D0_{ij} \leq B_{ij}$), the instruction unit 430 outputs a switching instruction SG52 indicating that the selection destination of the optical signal having the ith wavelength or/and the optical signal having the jth wavelength is switched from the 0-system to the 1-system, to the switching unit 440. Note that when any of the level differences $D0_{ij}$ is greater than the threshold $B_{ij}$ ($D0_{ij} > B_{ij}$), or smaller than the threshold $B_{ij}$ ($D0_{ij} < B_{ij}$), the instruction unit 430 may output the switching instruction SG52.

For the 1-system as well, similarly, the instruction unit 430 uses the optical signal levels M1(1) to M1(N) to calculate a level difference $D1_{ij}$ (=M1(i)−M1(j)) between optical signal levels of the wavelength i and the wavelength j adjacent to each other. The instruction unit 430 compares the threshold $B_{ij}$ to the level difference $D1_{ij}$. When any of the level differences $D1_{ij}$ is the threshold $B_{ij}$ or greater (difference $D1_{ij} \geq B_{ij}$), or the threshold $B_{ij}$ or less (difference $D1_{ij} \leq B_{ij}$), the instruction unit 430 outputs a switching instruction SG52 indicating that the selection destination of the optical signal having the ith wavelength or/and the optical signal having the jth wavelength is switched from the 1-system to the 0-system, to the switching unit 440. Note that when any of the level differences $D1_{ij}$ is greater than the threshold $B_{ij}$ ($D1_{ij} > B_{ij}$), or smaller than the threshold $B_{ij}$ ($D1_{ij} < B_{ij}$), the instruction unit 430 may output the switching instruction SG52.

When receiving the switching instruction SG52 for switching to the 1-system from the instruction unit 430, the switching unit 440 selects SG21-$i$ or/and SG21-$j$ as the optical signal having the ith wavelength or/and the optical signal having the jth wavelength and outputs the selected SG21-$i$ or/and SG21-$j$ to the multiplexing unit 370. Further, when receiving the switching instruction SG52 for switching to the 0-system from the instruction unit 430, the switching unit 440 selects SG20-$i$ or/and SG20-$j$ as the optical signal having the ith wavelength or/and the optical signal having the jth wavelength and outputs the selected SG20-$i$ or/and SG20-$j$ to the multiplexing unit 370. With such selection of the optical signals, the switching unit 440 selects the optical signals having the first to Nth wavelengths from either the 0-system or the 1-system based on the switching instruction, and outputs the selected optical signals having the N wavelengths to the multiplexing unit 370. Note that when receiving a plurality of switching instructions, the switching unit 440 switches the selection destination of the optical signals for each of the received switching instructions.

Note that when the selection destination is switched for any one of the optical signal having the ith wavelength and the optical signal having the jth wavelength, it may be arbitrarily determined which selection destination to select.

Note that when the selection destination is switched for both the optical signal having the ith wavelength and the optical signal having the jth wavelength in response to the switching instruction, it may be assumed that switching based on a determination result of (i, j) and switching based on a determination result of (i−1, j−1) or (i+1, j+1) contradict each other and it is impossible to determine which of the 0-system and the 1-system to select. In such a case, the instruction unit 430 may be configured to determine whether or not switching is required in accordance with a predetermined rule. For example, the switching unit 440 may be configured to prioritize (or not to prioritize) switching to another system, or vice versa. Alternatively, for example, the switching unit 440 may be configured to determine whether or not switching is required depending on a magnitude of a signal level or a signal level difference in each determination result.

The multiplexing unit 370 multiplexes optical signals having N wavelengths output from the switching unit 440 to generate the multiplexed signal SG22, and outputs the generated multiplexed signal SG22 to the optical output unit 380.

With the signal selection apparatus according to the second embodiment configured in this way, it is possible to detect presence or absence of deterioration of an optical signal based on an optical signal level difference between adjacent wavelengths. Thus, in a system that transmits a multiplexed signal, it is possible to reduce the frequency of signal interruption while suppressing quality deterioration caused by an optical signal level difference between adjacent wavelengths deviated from a range of prescribed values.

Modified Example

Note that the storage unit 420 may be provided in an apparatus outside the signal selection apparatus 260, or may be provided outside the signal selection unit 263$a$ in the signal selection apparatus 260. In addition, the instruction unit 430 and the storage unit 420 may be included in an apparatus outside the signal selection unit 263$a$ or the signal selection apparatus 260. For example, an external control apparatus that monitors and controls the video communication network system 100 or the optical transmission system 200 may have the instruction unit 430 and the storage unit 420.

The instruction unit 430 may be configured to instruct the switching unit 360 to switch the selection destination of the optical signal having the nth wavelength back to the 0-system from the 1-system, when a level difference for the 0-system optical signal having the nth wavelength returns to the prescribed range after an instruction for switching the selection destination of the optical signal having the nth wavelength from the 0-system to the 1-system has been issued. Similarly, the instruction unit 430 may be configured to instruct the switching unit 360 to switch the selection target of the optical signal having the nth wavelength back to the 1-system from the 0-system, when a level difference for the 1-system optical signal having the nth wavelength returns to the prescribed range after an instruction for switching the selection destination of the optical signal having the nth wavelength from the 1-system to the 0-system has been issued. Note that, in a case where the 0-system optical signal is preferentially selected, only the former function may be included in the instruction unit 430.

In each of the above embodiments, the signal selection apparatus is an example of the optical transmission apparatus in the present invention. In addition, the 0-system multiplexed signal and the 1-system multiplexed signal input to the signal selection apparatus are examples of the first multiplexed signal and the second multiplexed signal in the present invention, respectively. Moreover, the 0-system demultiplexing unit and the 1-system demultiplexing unit included in the signal selection apparatus are examples of the first demultiplexing unit and the second demultiplexing unit in the present invention, respectively. In addition, the 0-system measurement detection unit and the 1-system measurement detection unit included in the signal selection apparatus according to the first embodiment are examples of the first detection unit and the second detection unit in the present invention, respectively. Moreover, the measurement detection unit and the instruction unit included for each of the 0-system and the 1-system in the signal selection apparatus according to the second embodiment are examples of the first detection unit and the second detection unit in the present invention, respectively. Furthermore, the switching unit included in the signal selection apparatus is an example of the selection unit in the present invention.

Note that the function of detecting presence or absence of deterioration of an optical signal based on a measurement result of a signal level or a signal level difference by the measurement detection unit, or/and the function of switching the selection destination of optical signals having respective wavelengths based on the presence or absence of deterioration of the optical signal may be included in the switching unit.

Although embodiments of the present invention have been described above in detail with reference to the drawings, the specific configurations thereof are not limited to those of the embodiments and also include designs or the like without departing from the spirit of the present invention.

REFERENCE SIGNS LIST

100 Video communication network system
110, 111 Transmitter
120 Filter 130, 140 Transmission apparatus
150 Filter
160 Access network
170, 171 Receiver
200 Optical transmission system
210, 211 Head end
220, 221, 230, 231 Optical transmission unit
240, 241 Multiplexing unit
245, 246 Transmission line
250, 251, 261, 262 Amplification-for-relay unit
260 Signal selection apparatus
263, 263a Signal selection unit
270 Amplification unit
280 Distribution unit
290 Optical reception unit
310, 311 Optical input unit
320, 321 Demultiplexing unit
330, 331 Branching unit
340 Storage unit
350, 351 Measurement detection unit
360 Switching unit
370 Multiplexing unit
380 Optical output unit
410, 411 Measurement detection unit
420 Storage unit
430 Instruction unit
440 Switching unit
900 Video communication network system
910, 911 Transmitter
920, 921 Transmission apparatus
930 Filter
940 Access network
950, 951 Receiver
980 Signal selection unit
981, 982 Optical input unit
983, 984 Detection unit
985 Switching unit
986 Optical output unit

The invention claimed is:

1. An optical transmission apparatus for redundantly transmitting a multiplexed signal obtained by multiplexing N (N is an integer of 2 or greater) optical signals having different wavelengths, the optical transmission apparatus comprising:
    a first demultiplexing unit to which a first multiplexed signal is input, the first demultiplexing unit configured to demultiplex the input first multiplexed signal into the N optical signals;
    N first detection units to which the N optical signals demultiplexed by the first demultiplexing unit are respectively input, each of the N first detection units configured to detect presence or absence of deterioration of a corresponding input optical signal of the input optical signals based on a signal level of the corresponding input optical signal;
    a second demultiplexing unit to which a second multiplexed signal is input, the second demultiplexing unit configured to demultiplex the input second multiplexed signal into the N optical signals;
    N second detection units to which the N optical signals demultiplexed by the second demultiplexing unit are respectively input, each of the N second detection units configured to detect presence or absence of deterioration of a corresponding input optical signal of the input optical signals based on a signal level of the corresponding input optical signal; and
    a selection unit configured to select, based on detection result of presence or absence of deterioration of each of the optical signals by the first detection units and the second detection units, N optical signals having different wavelengths from either the optical signals demultiplexed by the first demultiplexing unit or the optical signals demultiplexed by the second demultiplexing unit;
    wherein for each selected optical signal, difference between signal level of the selected optical signal and signal level of another optical signal having a wavelength adjacent to the wavelength of the selected signal is less than a threshold; and
    a multiplexing unit configured to multiplex the N optical signals having different wavelengths selected by the selection unit.

2. An optical transmission method for redundantly transmitting a multiplexed signal obtained by multiplexing N (N is an integer of 2 or greater) optical signals having different wavelengths, the optical transmission method comprising:
    a first demultiplexing step of inputting a first multiplexed signal and demultiplexing the input first multiplexed signal into the N optical signals;
    N first detection steps of inputting the N optical signals demultiplexed in the first demultiplexing step, each of the first N detection steps including detecting presence or absence of deterioration of a corresponding input optical signal of the input optical signals based on a signal level of the corresponding input optical signal;
    a second demultiplexing step of inputting a second multiplexed signal and demultiplexing the input second multiplexed signal into the N optical signals;
    N second detection steps of inputting the N optical signals demultiplexed in the second demultiplexing step, the N second detection steps including detecting presence or absence of deterioration of a corresponding input optical signal of the input optical signals based on a signal level of the corresponding input optical signal;
    a selection step of selecting, based on detection result of presence or absence of deterioration of each of the optical signals in the first detection step and the second detection step, N optical signals having different wavelengths from either the optical signals demultiplexed in the first demultiplexing step or the optical signals demultiplexed in the second demultiplexing step, wherein for each selected optical signal, difference between signal level of the selected optical signal and signal level of another optical signal having a wavelength adjacent to the wavelength of the selected signal is less than a threshold; and
    multiplexing the selected optical signals together.

* * * * *